United States Patent Office 3,654,358
Patented Apr. 4, 1972

3,654,358
OXIDATION OF HALOGENATED ETHYLENES
Gaines C. Jeffrey, Houston, Tex., assignor to The Dow Chemical Company, Midland, Mich.
No Drawing. Continuation-in-part of application Ser. No. 672,955, Oct. 5, 1967. This application Apr. 24, 1970, Ser. No. 31,752
Int. Cl. C07c 51/58
U.S. Cl. 260—544 Y     5 Claims

ABSTRACT OF THE DISCLOSURE

This invention relates to the oxidation of halogenated ethylenes in the presence of a chemical initiator.

CROSS-REFERENCE TO RELATED APPLICATION

This application is a continuation-in-part of copending application Ser. No. 672,955 filed Oct. 5, 1967 by the same inventors, now abandoned.

BACKGROUND OF THE INVENTION

It is known in the art that the oxidation of halogenated ethylenes such as tetrachloroethylene may be accomplished utilizing ultraviolet light or actinic irradiation by methods such as are reported in U.S. Pat. 2,321,823, and 2,736,695 or JACS 54, 3852 (1932). It is also known that the oxidation may be carried out in the presence of an organic peroxide and chlorine as reported in U.S. Pat. 2,472,946.

Hitherto, however, no oxidation method of preparing products such as, for example, trichloroacetyl chloride from perchloroethylene, has been commercialized.

SUMMARY OF THE INVENTION

It has now been found that the oxidation of halogenated ethylenes to provide predominant amounts of the corresponding acid halide can be inexpensively and effectively carried out in the substantial absence of free halogens by the use of certain chemical free-radical initiators from the group consisting of azo compounds, t-butyl perbenzoate, di-isopropyl peroxy dicarbonate or di-sec-butyl peroxydicarbonate.

DESCRIPTION OF THE PREFERRED EMBODIMENTS

The chemical initiators which are useful in the process of this invention include azobisisobutyronitrile, t-butyl perbenzoate, sec-butyl percarbonate, isopropyl percarbonate, and mixtures thereof. The initiators are preferably employed in amounts of from 0.001 to 1.0 mole percent based on the halogenated ethylene. t-Butyl perbenzoate, di-isopropyl peroxy dicarbonate, and di-sec-butyl peroxy dicarbonate are advantageously employed with azobisisobutyronitrile being preferred.

Halogenated ethylenes which may be effectively oxidized by the process of this invention include, for example, tetrachloroethylene, trichloroethylene, dichloroethylene and brominated, fluorinated and iodinated ethylenes.

These materials may be inhibited or uninhibited. If they contain commercial inhibitors, such as, for example, 3-amino-2-methyl-butan-2 ol, 2-methyl-3-butyne-2 ol, 2-halothiophenes, nitromethane, alkoxy alkyl nitriles, N-alkyl pyrroles, t-alkyl amines, thymol, phenols, epoxy compounds, tetrahydrothiophene, dimethyl hydrazine, 4-methyl morpholine, the reaction induction period may sometimes be longer than if no inhibitor is present.

Any source of molecular oxygen, e.g. pure oxygen or air, may be employed. Pure molecular oxygen is preferably employed, at a pressure of from about 50 to 500 p.s.i.g. The reaction temperature may be any temperature from the temperature at which the free radical generator is active to the decomposition temperature of the acyl chloride product. Advantageously the temperature is from about 60° to about 110° C., and the pressure about 200–300 p.s.i.g.

The system may be mechanically stirred, shaken, or recycled and oxygen may be sparged in if desired. The process may be conducted batch-wise, semi-continuously or continuously and one may employ solvents and/or carriers or promoters to lower the activation energy of the system.

The invention is further illustrated by the following examples:

Example I

Employing a continuous reactor system having a four-liter feed tank and a 1-liter 316 stainless steel reactor, tetrachloroethylene containing a mixture of 4-methylmorpholine and tri-n-butylamine inhibitors and containing 0.01 mole percent of azobisisobutyronitrile (ABN) was fed into the reactor along with molecular oxygen. A reactor pressure of 100 p.s.i.g. and a reactor contact time of 13.6 hours was employed. The reactor was heated to the temperature shown in the following table. Samples from the product stream were collected in a cold trap and analyzed by mass spectrometry. The results were as follows:

| Temp., ° C. | Percent TCE conversion | Percent yield of— | | |
|---|---|---|---|---|
| | | Trichloroacetyl chloride (TCAC) | Tetrachloroethylene oxide (TCEO) | Phosgene |
| 80 | 21.8 | 46.3 | 43.4 | 10.4 |
| 90 | 23.3 | 62.7 | 26.5 | 10.9 |
| 100 | 23.6 | 69.3 | 20.4 | 10.3 |
| 110 | 30.6 | 83.9 | 7.8 | 8.3 |
| 120 | 27.0 | 84.5 | 4.9 | 10.5 |
| 150 | 6.3 | 88.8 | 0.6 | 10.6 |

Example II

Following the above procedure but holding the reaction temperature constant at 100° C. and varying the reactor contact time produced these results.

| Contact time (hrs.) | Percent TCE conversion | Percent yield of— | | |
|---|---|---|---|---|
| | | TCAC | TCEO | Phosgene |
| 5.9 | 13.5 | 65.0 | 26.0 | 9.0 |
| 10.2 | 19.8 | 71.4 | 17.6 | 11.1 |
| 10.4 | 21.4 | 71.5 | 18.4 | 10.1 |
| 13.6 | 23.6 | 69.3 | 20.4 | 10.3 |
| 18.3 | 26.4 | 88.7 | 3.7 | 8.6 |
| 25.6 | 29.8 | 92.5 | 4.4 | 3.2 |

Example III

Following the above procedure, temperature and pressure and employing a reactor contact time of 13.6 hours the following results were obtained when varying the ABN concentration.

| ABN conc. (mole percent) | TCE conversion (percent) | Trichloroacetyl chloride yield (percent) | Tetrachloroethylene oxide yield (percent) | Phosgene yield (percent) |
|---|---|---|---|---|
| 0.005 | 18.7 | 71.8 | 19.2 | 9.0 |
| 0.01 | 23.6 | 69.3 | 20.4 | 10.3 |
| 0.02 | 22.5 | 75.3 | 16.0 | 8.8 |
| 0.05 | 25.3 | 70.7 | 20.5 | 8.9 |
| 0.10 | 26.9 | 68.6 | 21.4 | 9.7 |

Example IV

Following the above procedures and temperature and employing an ABN concentration of 0.01 mole percent and a contact time of 10.2 hours the following results were obtained when varying the pressure:

| Reactor pressure (p.s.i.g.) | Tetrachloroethylene conversion (percent) | Trichloroacetyl chloride yield (percent) | Tetrachloroethylene oxide yield (percent) | Phosgene yield (percent) |
|---|---|---|---|---|
| 60 | 14.1 | 68.4 | 19.5 | 12.0 |
| 100 | 19.8 | 71.4 | 17.6 | 11.1 |
| 200 | 26.9 | 73.2 | 15.8 | 10.5 |
| 350 | 36.9 | 73.5 | 14.8 | 11.7 |

Example V

The reactor was a stainless steel bomb of about half a liter capacity. An intermediate oxygen cylinder, calibrated in grams delivered versus pressure drop, was situated between the reactor and the source of oxygen.

After charging the reactor, the free-space was swept out with oxygen. A standard charge of 200 grams of inhibited tetrachloroethylene containing a mixture of 4-methyl-morpholine and tri-n-butyl amine was used, leaving approximately 480 ml., of free space. After sweeping with oxygen, the reactor was pressured with oxygen to 100 p.s.i.g. and the temperature raised to 110° C.

After the reaction was shut down, the reactor was cooled to approximately 0° C. and a sample transferred to a cool bottle, and analyzed by vapor-phase chromatography.

Supplementary information was obtained on certain critical samples by infrared spectroscopy.

The following results show that, for concentrations of azobisisobutyronitrile between 0.001 and 0.25 mol percent of tetrachloroethylene charged, there was no significant effect on the yield of trichloroacetyl chloride. At a 0.0002% ABN concentration, no reaction occurred. It would appear, then, that the critical concentration of ABN required to initiate reaction lies somewhere between 0.0002% and 0.001%.

| Run No. | Time (hrs.) | ABN concentration (percent) | TCE conversion (percent) | TCAC yield (percent) |
|---|---|---|---|---|
| 1 | 18 | 0.25 | 49.8 | 76.2 |
| 2 | 8 | .10 | 35.6 | 86.5 |
| 3 | 5½ | .10 | 31.5 | 80.8 |
| 4 | 5½ | 0.01 | 20.8 | 84.8 |
| 5 | 5½ | .001 | 15.2 | 80.9 |
| 6 | 1½ | .0002 | (1) | |

[1] No reaction.

Example VI

Trichloroethylene containing 20 p.p.m. of diisocpropyl-amine was oxidized at 100° C., 100 p.s.i.g. of $O_2$, 0.02 mole percent ABN (based on trichloroethylene) for a period of 4 hours. The conversion was 48.5 percent, and percent yields of products were as follows:

Dichloroacetyl chloride _____ 53.9
Trichloroacetaldehyde _____ 31.3
Trichloroethylene oxide _____ 10.6
Phosgene _____ 4.2

Example VII

In another experiment dichloroethylene, consisting of 62% cis isomer and 38% of the trans isomer, was oxidized at 100° C., 100 p.s.i.g. of $O_2$, using 0.02 mole percent ABN (based on dichloroethylene) for a period of 21 hours. Results were as follows:

(a) 11% of the trans isomer converted. 79% yield of trans-1,2-dichloroethylene oxide. 20.5% yield of 1,1-dichloroacetaldehyde.
(b) 0.9% of the cis isomer converted. Cis-1,2-dichloroethylene oxide was major product.

Example VIII

A 360-ml. nickel-chrome reactor was charged with 100 grams (0.60 mol) of inhibited tetrachloroethylene and 0.14 gram ($6 \times 10^{-4}$ mols) of di-sec-butyl peroxy dicarbonate. The temperature was raised to 60° C., the reactor was pressured to 300 p.s.i.g. with oxygen and a Teflon coated magnetic stirring bar was activated. After 25½ hours a sample was taken and analyzed by infrared. The conversion was 48%. The yield of trichloroacetyl chloride (TCAC) was 90%. The mole ratio of $COCl_2/TCAC$ was 0.21.

Example IX

The procedure of Example VIII was repeated except that di-isopropyl peroxy dicarbonate (023 gram, 0.011 mole) was employed as the catalyst and the reaction was continued for 46 hours. The conversion was 68%, the yield of TCAC was 92% and $COCl_2/TCAC$ ratio was 0.18.

Example X

Using the apparatus of Example V, 200 grams of inhibited tetrachloroethylene and 0.24 gram (0.0012 mole) of t-butyl perbenzoate was stirred at 110° C. under 110–114 p.s.i.g. total pressure for 3¾ hours. The oxygen valve was then closed, and the reaction mixture was held at 110° C. an adidtional two hours. The conversion was 16% and yield of TCAC was 82%.

I claim:

1. Process for the preparation of an acid halide by the oxidation of a halogenated ethylene, in the substantial absence of free halogen, consisting of contacting said halogenated ethylene with oxygen at a pressure of from about 50 to 500 p.s.i.g. and at a temperature of from about 60° to 110° C. in the presence of azobisisobutyronitrile.

2. Process of claim 1 wherein the halogenated ethylene is a chlorinated ethylene.

3. Process of claim 2 wherein the halogenated ethylene is dichloroethylene.

4. Process of claim 1 wherein the halogenated ethylene is tetrachloro- or trichloroethylene.

5. Process of claim 2 wherein the chlorinated ethylene is tetrachloroethylene.

References Cited

UNITED STATES PATENTS

| | | | |
|---|---|---|---|
| 3,509,210 | 4/1970 | Gaertner | 266—544 |
| 2,472,946 | 6/1949 | Hart | 260—544 |
| 2,321,823 | 6/1943 | Kirkbride | 204—163 |
| 2,292,129 | 8/1942 | Kirkbride | 204—163 |

OTHER REFERENCES

Gould: Mechanism & Structure in Org. Chem. (1965 ed.), pp. 687–691.

LORRAINE A. WEINBERGER, Primary Examiner

E. J. GLEIMAN, Assistant Examiner

U.S. Cl. X.R.

260—348.5 V, 601 H